United States Patent [19]
Honda et al.

[11] Patent Number: 6,154,257
[45] Date of Patent: Nov. 28, 2000

[54] METHOD FOR IDENTIFYING INPUT VIDEO SIGNAL AND PROCESSING THE VIDEO SIGNAL

[75] Inventors: Hirofumi Honda; Tetsuro Nagakubo, both of Yamanashi-ken, Japan

[73] Assignee: Pioneer Electronic Corporation, Tokyo, Japan

[21] Appl. No.: 09/252,800

[22] Filed: Feb. 19, 1999

[30] Foreign Application Priority Data

Mar. 6, 1998 [JP] Japan .................................. 10-073549
Mar. 10, 1998 [JP] Japan .................................. 10-076647

[51] Int. Cl.$^7$ ................................ H04N 5/46; H04N 7/01
[52] U.S. Cl. ............................ 348/558; 348/459; 348/911
[58] Field of Search .................................. 348/558, 443, 348/459, 911, 526, 441, 97; H04N 5/46, 7/01, 11/20, 5/08

[56] References Cited

U.S. PATENT DOCUMENTS

| | | | |
|---|---|---|---|
| 5,757,421 | 5/1998 | Kato | 348/97 |
| 5,835,672 | 11/1998 | Yagasaki | 386/111 |
| 5,982,444 | 11/1999 | Kato | 348/446 |

*Primary Examiner*—Sherrie Hsia
*Attorney, Agent, or Firm*—Arent Fox Kintner Plotkin & Kahn PLLC

[57] ABSTRACT

A first correlation between a present field of an input video signal and a one-field preceding field, and a second correlation between the present field and a one-field succeeding field are detected. The first correlation and the second correlation are compared with each other, and the input video signal is determined as a telecine-converted video signal when either of the first correlation or the second correlation is larger than the other correlation.

7 Claims, 9 Drawing Sheets

METHOD FOR IDENTIFYING INPUT VIDEO SIGNAL AND PROCESSING THE VIDEO SIGNAL

BACKGROUND OF THE INVENTION

The present invention relates to a method for identifying the type of an input video signal, namely, whether the input signal is a video signal of a standard television signal picked up by a television camera or a telecine-converted video signal generated from a motion picture film by the 2-3 pull-down method, and also to a method for converting the input video signal formed in accordance with the interlaced scanning into a video signal similar to a sequential scanning signal.

The video signals for standard television system such as the NTSC system include a video signal generated from a film of a movie. Such a movie film video signal comprises 24 frames per second. On the other hand, the video signal for NTSC system is an interlaced video signal comprising 30 frames, or 60 fields, per second. Hence the movie film video signal must be converted to the standard television signal by the 2-3 pull-down method.

In the 2-3 pull-down method, the film is scanned to generate a video signal sequentially scanned at the frequency of 24 Hz. For example, the first frame of the film is converted to correspond to first and second fields, the second frame to third to fifth fields, the third frame to sixth and seventh fields, and the fourth frame to eighth to tenth fields.

When one frame of the film is converted to three fields, such as in the case of the second and fourth film frames, the last field has the same content as the first field. Namely, the fifth and tenth fields coincides with the third and eighth fields, respectively. Hence the two frames of the movie film correspond to five fields of the video signal for the standard television system, wherein the frames are alternately repeated twice and three times.

In the thus generated video signal, the third field and the fifth field, and the eighth field and the tenth field become identical. Hence the difference between the second and third frames, and the difference between fifth and sixth frames become zero. Such a relationship occurs every five fields.

Namely, in order to determine whether the television video signal is a telecine-converted signal produced from a film or originally a television video signal, the absolute values of the differences between the frames are added up during a period corresponding to one field. The added value is compared with a predetermined threshold and when the added value is larger than the threshold, the field is determined as a moving field. On the other hand, when the added value is smaller, the field is a still field. The still field is generated every fifth field in the video signal produced from the film in the case of the 2-3 pull-down system, forming a periodic pattern. Hence the telecine-converted video signal can be discriminated from the standard television video signal if the period pattern in which the still field appears every five fields is detected.

However, in the above described detecting method, since the added absolute values between the fields must be compared over a plurality of fields, for example, at least five fields in the case of 2-3 pull-down method, it is difficult to quickly respond to the change of the video signals. In addition, the film may be edited so that the periodic pattern of the still field in the telecine-converted video signal may be disturbed. Hence the telecine-converted video signal cannot be quickly determined.

Moreover, if another method besides the 2-3 pull-down method is used, the detecting method must be modified in accordance with the periodic pattern.

Another problem which occurs in the telecine-converted video signal is that since two fields constitute one television frame, some television frame comprises fields produced from different film frame. For example, the third television frame, which comprises the fifth field generated from the second film frame and the sixth field generated from the third film frame. The image of such a frame is inferior in quality to that of the original film frame.

SUMMARY OF THE INVENTION

An object of the present invention is to provide a method for determining whether the input video signal is a telecine-converted signal generated from a film or a television video signal, wherein the change from a telecine-converted video signal to a standard television video signal, and vice versa, and the discontinuous periodic pattern of the still field can be quickly detected.

Another object is to provide a method for processing the video signal so that when such a discontinuity occurs, the data of the video signal can be appropriately interpolated.

Another object is to provide a display device wherein the images created by the telecine-converted signal can be improved.

According to the present invention, there is provided a method for identifying an input video signal, the steps comprising, detecting a first correlation between a present field of an input video signal and a one-field preceding field, and a second correlation between the present field and a one-field succeeding field, comparing the first correlation and the second correlation with each other, and determining the input video signal as a telecine-converted video signal when either of the first correlation or the second correlation is larger than the other correlation.

The method further comprises, determining the input video signal as a video signal of a standard television when the first correlation and the second correlation are approximately equal to each other and the input video signal is a moving picture.

The first correlation is provided by adding together points which are flat in a vertical direction and moving in a horizontal direction in a range where the correlation between the present field and the one-field preceding field is larger than that of the one-field succeeding field, the second correlation is provided by adding together points which are flat in a vertical direction and moving in a horizontal direction in a range where the correlation between the present field and the one-field succeeding field is larger than that of the one-field preceding field.

The present invention further provides a method for processing a video signal wherein an interpolation scanning signal is produced from an interlaced actual scanning input video signal, the actual scanning input video signal and interpolation scanning signal are mutually inserted, the steps comprising, detecting a first correlation between a present field of an input video signal and a one-field preceding field, and a second correlation between the present field and a one-field succeeding field, comparing the first correlation and the second correlation with each other, and producing the interpolation scanning signal by using the actual scanning video signal when the first correlation is larger than the second correlation, and producing the interpolation scanning signal by using the actual scanning video signal in the one-field succeeding field when the second correlation is larger than the first correlation.

The method further comprises obtaining a first interpolation scanning signal by an intra-field interpolation process, and a second interpolation scanning signal by an inter-field interpolation process when the first correlation and the second correlation are approximately equal to each other and the input video signal is a moving picture, and by weighting and adding together the first and second interpolation scanning signals by using movement information of the video signal.

The present invention further provides a display device comprising, detector means for detecting whether an input video signal is a telecine-converted video signal of a unit of 60 Hz field which is obtained by converting a film source of 24 Hz or not, processing means for removing an overlapping field in the telecine-converted video signal to produce a video signal of 24 Hz, and driving means for driving a display device for displaying the video signal of 24 Hz.

These and other objects and features of the present invention will become more apparent from the following detailed description with reference to the accompanying drawings.

DETAILED DESCRIPTION OF THE PREFERRED EMBODIMENT

A video signal processing device according to the present invention is adapted to be provided in a matrix display device such as a plasma display panel (PDP), electroluminescent (EL) panel, and liquid crystal display panel. The processing device generates one scanning line interpolation video signals based on red (R), green (G) and blue (B) input video signals. The input signals, which are one scanning line video signals produced by actual interlaced scanning, are converted into video signals similar to those obtained by sequential scanning by interpolating the one scanning line interpolation signal between the actual one scanning line video signals. The video signal processing device shown in FIG. 1 is provided for each of the R, G, and B input signals.

Figure 1:
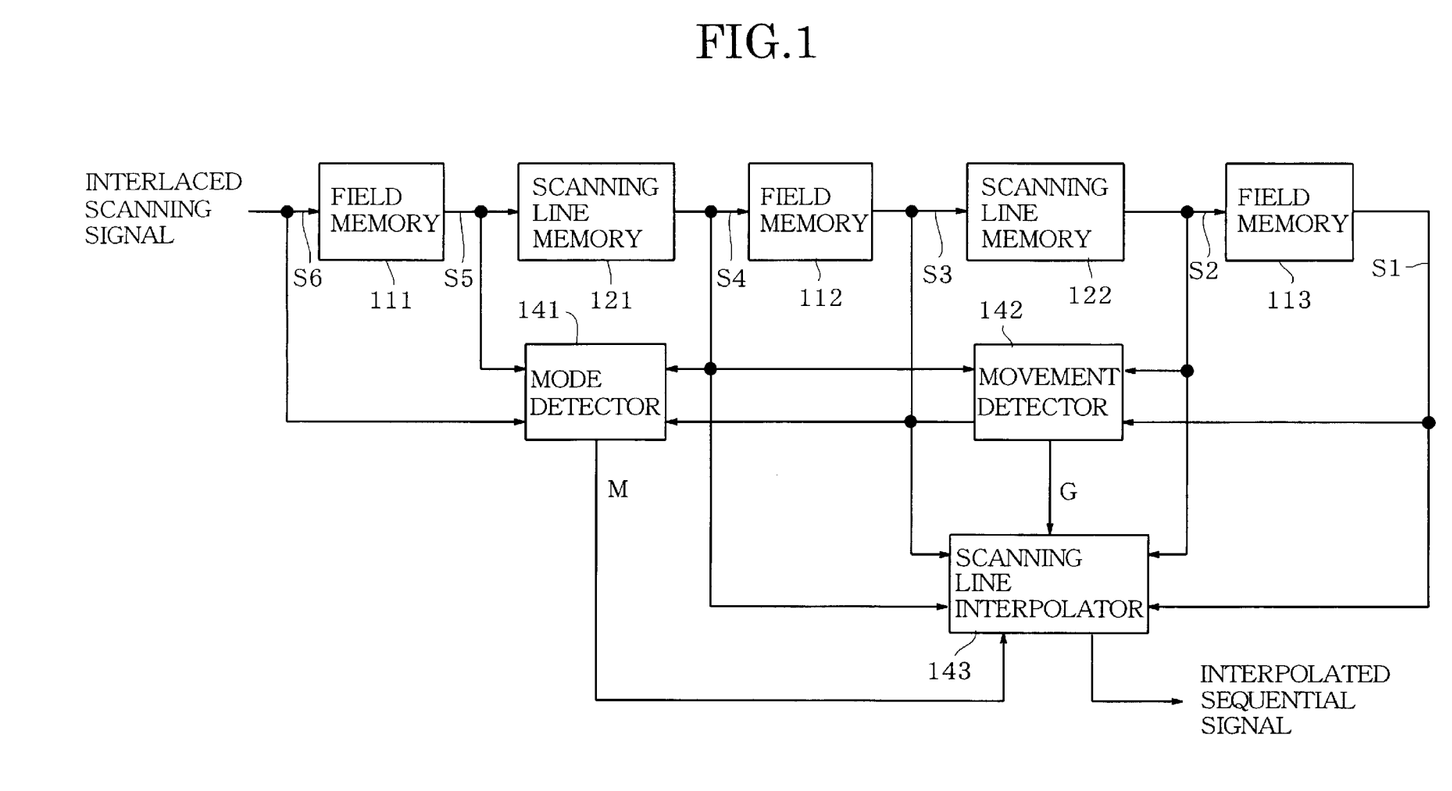
FIG. 1 is a block diagram showing a video signal processing device according to the present invention.

Referring to FIG. 1, the video signal processing device comprises three field memories 111, 112, and 113, scanning line memories 121 and 122 provided between the field memories 111 and 112, and between the field memories 112 and 113, respectively, mode detector 141 for detecting an operating mode based on a difference between the fields, movement detector 142 for detecting whether there is a movement in a picture dependent on a difference between the frames, and a scanning line interpolator 143 for interpolating a scanning line in accordance with control signals from the detectors 141 and 142.

When a scanning line video signal S6 is applied to the field memory 111, a scanning line video signal S5 of a field which precedes the field of the signal S6 one field and which is stored in the field memory 111 is read out. The video signal S5 is fed to the line memory 121, which in turn outputs a scanning line video signal S4 preceding the signal S5 one scanning line. The video signal S4 is fed to the field memory 112, thereby outputting a scanning line video signal S3 preceding the signal S4 one field. The video signal S3 is fed to the line memory 122, which in turn outputs a video signal S2 preceding the signal S3 one scanning line. The video signal S3 is fed to the field memory 113, thereby outputting a video signal S1 preceding the signal S2 one field. Thus five video signals S5 to S1 are outputted for the video signal S6.

The video signals S4 and s5 and one-field preceding and succeeding signals S3 and S6 are applied to the mode detector 141 to determine whether a picture generated by the input video signal is a picture from a film caused by a telecine-converted signal in accordance with the 2-3 pull-down method, and hence in a film moving picture mode, an ordinary picture caused by an standard television video signal, that is, in television moving picture mode, or a still picture. The mode detector 141 further determines an interpolating method in the case of the film moving picture mode.

Figure 2:
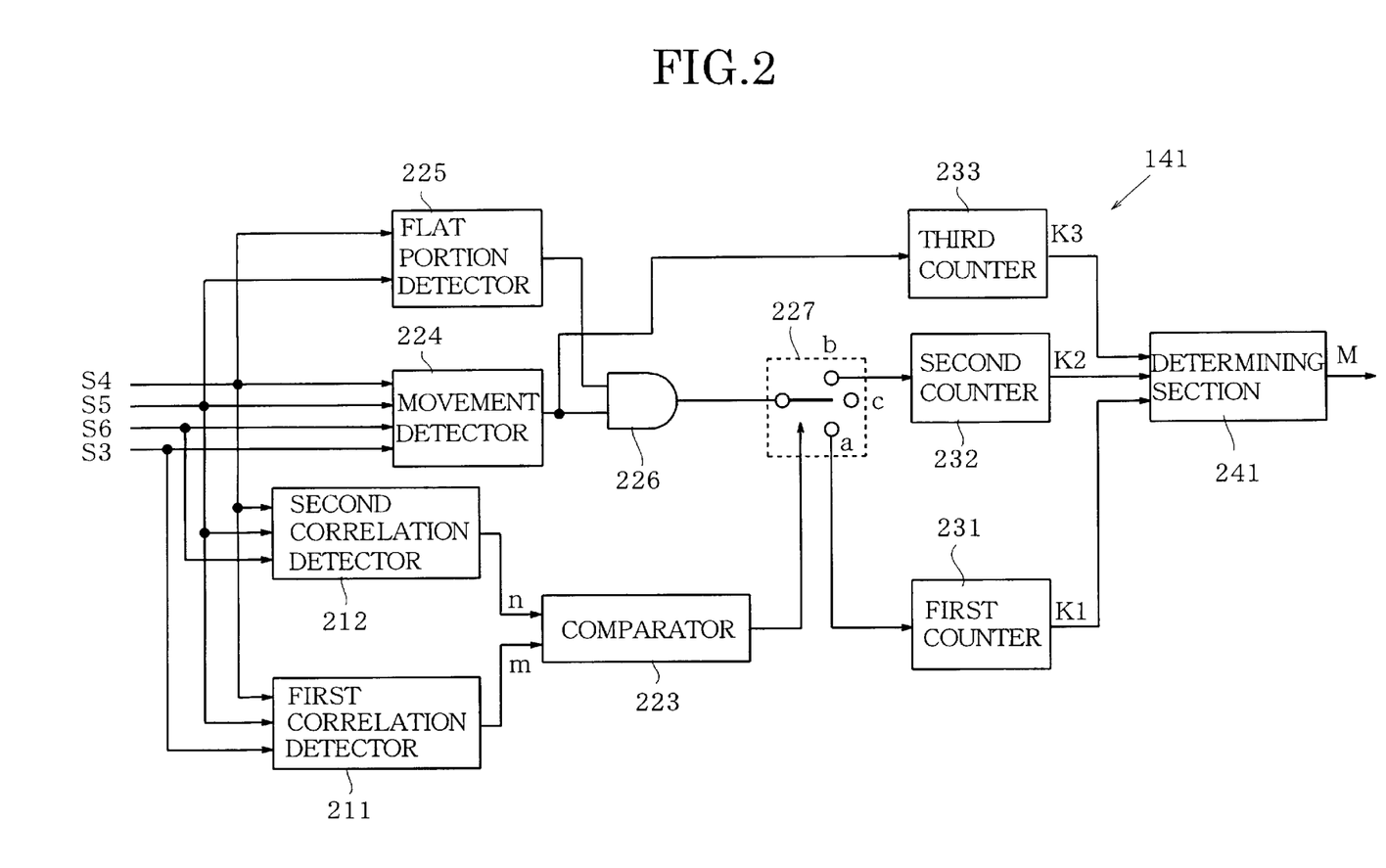
FIG. 2 is a block diagram of a mode detector provided in the video signal processing device of FIG. 1.

Referring to FIG. 2, the mode detector 141 has a first correlation detector 211 to which the video signals S3 to S5 are applied. The correlation detector 211 calculates an absolute value of the difference between the pixels of the upper and lower scanning line video signals S5 and S4, and a pixel of the video signal S3 of a one-field preceding field, and generates a value m which is the smaller of the two absolute values.

Figure 4:
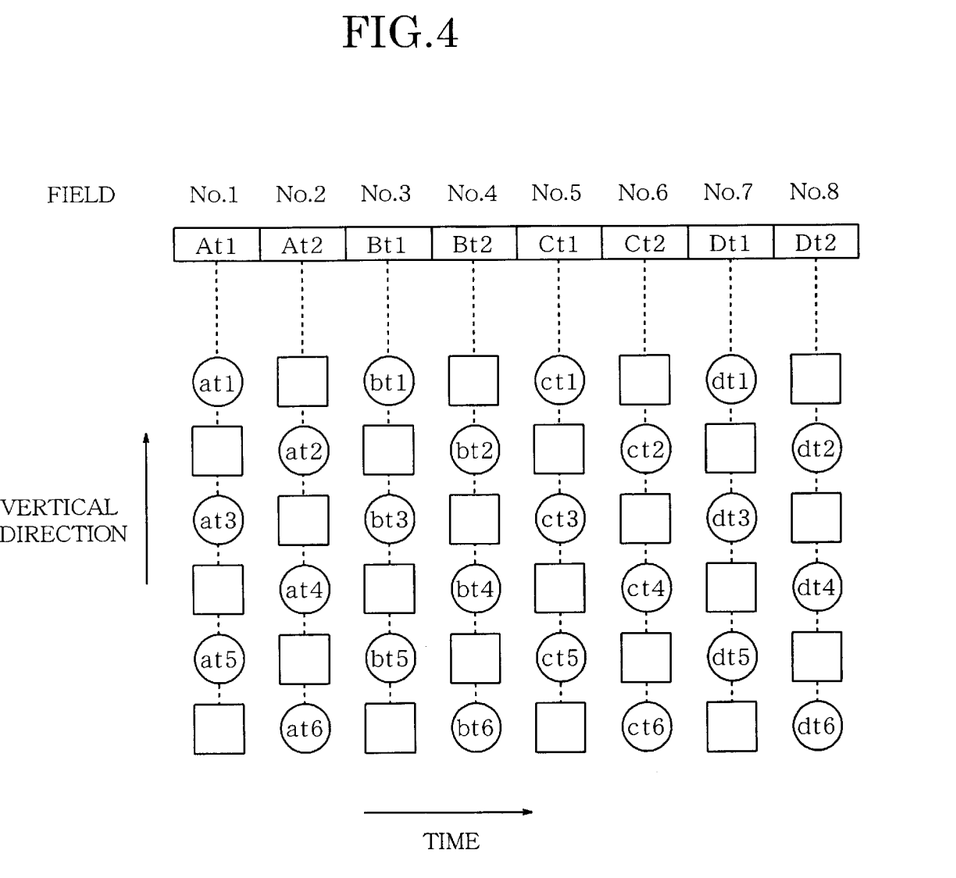
FIG. 4 is a diagram explaining positions of actual scanning signals and interpolated scanning signals of a standard television video signal.

Describing the operation in detail, in a diagram shown in FIG. 4, each circle designates a pixel for one scanning line signal in the standard television signal. For example, if the video signal S5 corresponds to a pixel bt3 in the present No. 3 field Bt1, the signal S4 corresponds to a pixel bt1 in the No. 3 field Bt1, and the signal S3 corresponds to a pixel at2 in the one-field preceding No. 2 field At2. The absolute values |bt1−at2| and |bt3−at2| of the differences between the fields No. 3 and No. 2 are calculated. The smaller absolute value is outputted as the minimum absolute value m.

Returning back to FIG. 2, the mode detector 141 further has a second correlation detector 212 to which the video signals S4 to S6 are applied. Similar to the first correlation detector 212, the second correlation detector 212 calculates an absolute value of the difference between the pixels of upper and lower scanning line video signals S5 and S4 of the present field and pixel of a one-field succeeding field. More particularly, referring to FIG. 4, the absolute value |bt2−bt1| of the difference between the pixel bt2 of the signal S6 and the pixel bt1 of the signal S4, and the absolute value |bt2−bt3| of the difference between the pixel bt2 of the signal S6 and the pixel bt3 of the signal S5 are calculated. The smaller absolute value is outputted as a minimum absolute value n.

The values m and n from the first and second correlation detectors 211 and 212, respectively, are fed to a comparator 223 where the values m and n are compared with each other. When m≧h·n, wherein h is a constant larger than 1 (h>1), for example 2, it means that the present field (field No. 3 in FIG. 4) is closer in correlation to the subsequent field (field No. 4) than the preceding field (field No. 2). On the other hand, when n≧h·m, it means that the present field is closer in correlation to the preceding field (field No. 2) than the subsequent field (field No. 4). The comparator 223 generates a control signal dependent on the comparison and applies the control signal to a changeover switch 227.

The mode detector 141 is further provided with a movement detector 224 to which the signals S3 to S6 are applied, and a flat portion detector 225 to which the signals S4 and S5 are applied. The movement detector 224 compares the pixel at2 of the signal S3 in the field No. 2 preceding the present field No. 3 with the pixel bt2 of the signal S6 in the subsequent field No. 4. Namely, an absolute value |at2−bt2| of a difference between the pixel at2 and the pixel bt2 is calculated. The absolute value is compared with a predetermined threshold. When the absolute value is larger than the threshold, it is determined that there is a movement, thereby rendering the level of a movement detecting pulse signal high.

The flat portion detector 225 calculates a difference between the pixel bt1 of the signal S4 and pixel bt3 of the signal S5 which are vertically adjacent to each other in the present field (field No. 3). The absolute value |bt1−bt3| of the difference is compared with a predetermined threshold. When the absolute value is smaller than the threshold, it is determined that the pixels are similar in a vertical direction, thereby rendering the level of a flat portion detecting pulse signal high.

The movement detecting pulse signal from the movement detector 224 and the flat portion detecting pulse signal from the flat portion detector 225 are applied to an AND circuit 226. When there is a point where the adjacent pixels are similar in vertical direction and the picture moves, the AND circuit 226 generates a detecting pulse. The detecting pulse is selectively applied to a first counter 231 or a second counter 232 through the changeover switch 227 controlled by the comparator 223.

The changeover switch 227 has three terminals a, b, and c, which are selectively connected to the AND circuit 226. When m≧h·n, indicating a situation where the present field is closer in correlation to the subsequent field (field No. 4) than the preceding field (field No. 2), the control signal from the comparator 223 operates a movable contact of the switch 227 so as to connect the AND circuit 226 with the terminal a. Hence, the detecting pulse is applied to the first counter 231 to count the number of the pulses. The first count K1 is fed to a determining section 241.

On the other hand, when n≧h·m, indicating a situation where the present field is closer in correlation to the preceding field (field No. 2) than the subsequent field (field No. 4), the comparator 223 applies a control signal to connect the terminal b with the AND circuit 226. Thus the number of the detecting pulses are counted at the second counter 232. The second count K2 is applied to the determining section 241.

When it is determined at the comparator 223 that m<h·n and n<h·m, so that a correlation value between the present field and the preceding field and that between the present field and the subsequent field are substantially the same, the movable contact of the changeover switch 227 is connected to the terminal c.

The movement detecting pulse from the movement detector 224 is further fed to a third counter 233 where the number of movement detecting pulses, is counted. The count K3 is also applied to the determining section 241.

The first to third counts K1 to K3 are reset at every field.

In the determining section 241, the first count K1 and the second count K2 are compared with each other, and the first count K1 and third count K3 are compared with respective predetermined thresholds. More particularly, when K1≧i·K2, where i is a constant larger than 1 (i>1), it is determined that the present field consists a moving picture and has a closer correlation with the subsequent field than the preceding field, and therefor in a subsequently inclined film moving picture mode (telecine-converted video signal).

When K2≧i·K1, it is determined that the present field consists a moving picture and has a closer correlation with the preceding field than the subsequent field, and therefor in a previously inclined film moving picture mode (telecine-converted video signal).

If the third count K3 is larger than the threshold, and at the same time, K1<i·K2, and K2<i·K1, it is determined that the present field consists an ordinary moving picture (video signal of the standard television system), and therefor, in a television moving picture mode.

When the first count K1 is smaller than the predetermined threshold, it is determined that the present field shows a still picture, and therefor in a still picture mode. When the determining section 241 determines the still picture mode, the mode of the previous field is maintained.

A mode signal M generated at the determining section 241 is applied to the scanning line interpolator 143 shown in FIG. 1.

The movement detector 142 shown in FIG. 1 is applied with the video signals S1 to S4. Since the signal S1 and the signal S4 inevitably belong to different frames, the difference between two frames can be detected as in a conventional detecting system described above. When there is a difference between the frames, a picture movement signal G is generated.

The picture movement signal G from the movement detector 142 and the mode signal M from the mode detector 141 are applied to the scanning line interpolator 143 which generates an interpolated sequential scanning signal.

Figure 3:
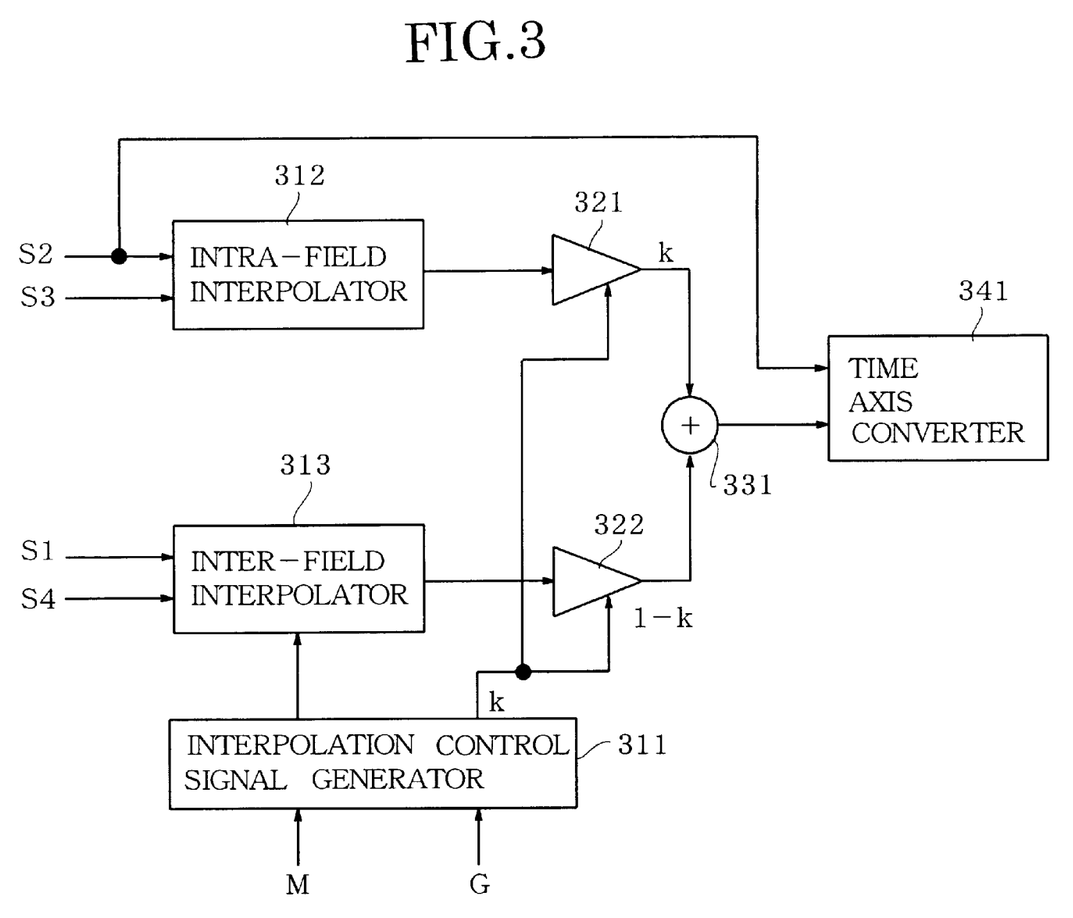
FIG. 3 is a block diagram of a scanning line interpolator provided in the video signal processing device of FIG. 1.

Referring to FIG. 3, the scanning line interpolator 143 comprises an intra-field interpolator 312 to which the video signals S2 and S3 are applied, and an inter-field interpolator 313 to which the video signals S1 and S4 are applied. The intra-field interpolator 313 produces a first interpolation scanning signal and the inter-field interpolator 313 produces a second interpolation scanning signal, each of which is to be interpolated between the actual scanning signals. The first interpolation scanning signal from the intra-field interpolator 312 is fed to a first coefficient circuit 321 and the second interpolation scanning signal from the inter-field interpolator 313 is fed to a second coefficient circuit 322. Both the coefficient circuits 321 and 322 are fed with mixing ratio control signal from an interpolation control signal generator 311.

The interpolation signal generator 311 determines a mixing ratio in accordance with the mode signal M from the mode detector 141 and the picture movement signal G from the movement detector 142, and applies a movement controlling coefficient k to the coefficient circuits 321 and 322. The first interpolation scanning signal is multiplied by the coefficient k and the second interpolation scanning signal is multiplied by a value 1−k. The first and second interpolation scanning signals are added together by an adder 331 as an interpolation scanning signal and applied to a time axis converter 341. The time axis converter 341 to which the video signal S2 is further applied, interpolates the interpolation scanning signal between the actual scanning signals, thereby forming a video signal similar to the sequentially scanning video signal.

More particularly, when the mode signal M shows that the picture is in the previously inclined or the subsequently inclined film moving picture mode, the movement controlling coefficient k is set to zero. The added interpolation signal comprises only the second interpolation scanning signal so that an inter-field interpolation using fields in close correlation is carried out.

When the picture is in the television moving picture mode, a movement adapted interpolation, wherein the respective first and second interpolation scanning signals are weighted and added together, is executed. Namely the interpolation control signal generator 311 sets the movement controlling coefficient k between zero and 1 (0<k≦1).

If the picture is in the still picture mode, the interpolation is carried out in the same manner as in the one field previous field.

Figure 5:
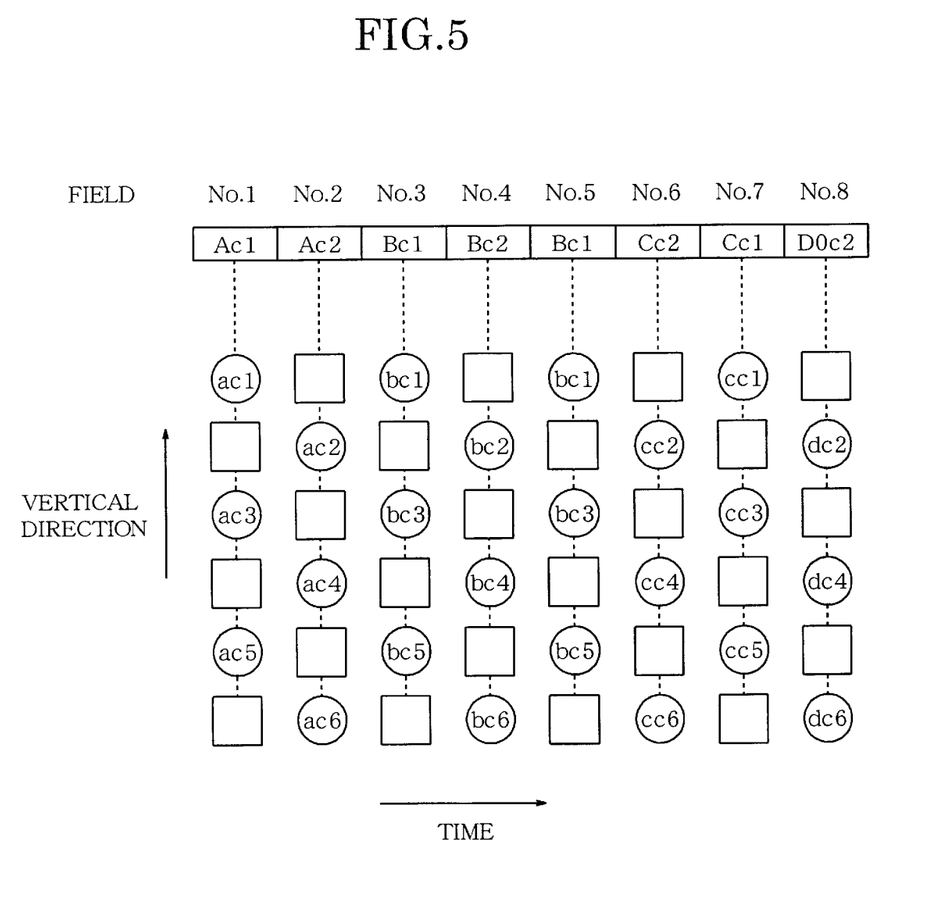
FIG. 5 is a diagram explaining positions of actual scanning signals and interpolated scanning signals of a telecine-converted video signal.

The operation of the method according to the present invention will be described hereinafter in detail with reference to FIGS. 4 and 5. FIG. 4 shows positions of actual scanning signals and interpolated scanning signals with respect to time and space in the standard television video signal, and FIG. 5 shows the positions of the actual scanning signals and interpolated scanning signals of the telecine-converted video signal. Namely, in FIG. 4, the standard television signal comprises a plurality of pairs of fields of odd and even numbers At1 and At2, Bt1 and Bt2, and so on, while the telecine-converted signal comprises a plurality of sets of five fields Ac1, Ac2, Bc1, Bc2 and Bc1. In each drawing, the circles indicate the pixels of actual scanning lines and the squares the pixels of interpolated scanning lines. The ordinate shows the vertical direction of the display and the abscissa shows the time axis. In the operation for obtaining the interpolation scanning signal for the pixel between the pixels bt1 and bt3 of the actual scanning line in the field No. 3, the pixel at2 is the pixel of the corresponding scanning line preceding one field and the pixel bt2 is the pixel of the corresponding scanning line subsequent one field.

The interpolating operation of the ordinary television video signal obtained by scanned by a television camera will be described.

Referring to FIGS. 1 and 4, the mode detector 141 determines that the field No. 3 (Bt1) is in the television moving picture mode. The interpolation control signal generator 311 (FIG. 3) accordingly sets the movement controlling coefficient k which determines the mixing ratio of the outputs of the intra-field interpolator 312 and the inter-field interpolator 313 dependent on the mode signal M from the mode detector 141 and the picture movement signal G from the movement detector 142.

The intra-field interpolator 312 calculates an average between the pixels bt1 and bt3 in the field No. 3 which are located directly above and below an interpolation pixel to be interpolated, and generates the first interpolation scanning signal of the interpolation pixel. The inter-field interpolator 313 calculates an average between the pixels at2 and bt2 in the adjacent fields Nos. 2 and 4 preceding and subsequent to the interpolation pixel to be interpolated, and generates the second interpolation scanning signal for the interpolation pixel. The first and second interpolation scanning signals are weighted in accordance with the coefficient k and added together.

The interpolating operation of the telecine-converted video signal generated by the 2-3 pull-down method is described.

Referring to FIG. 5, the mode detector 141, for example, determines that the field No. 3 (Bc1) is in the subsequently inclined film moving picture mode having a close correlation with the one field subsequent field, that is field No. 4 (Bc2). The interpolation control signal generator 311 accordingly sets the coefficient k to zero dependent on the mode signal M from the mode detector 141 and the picture movement signal G from the movement detector 142. Namely, in order to interpolate a pixel between the pixels bc1 and bc3 in the field No. 3 (Bc1), the pixel bc2 which exists at the same vertical space in the subsequent field No. 4 is selected and the value thereof is set as that of the interpolation pixel.

When interpolating pixels in the field No. 4 (Bc2), which has the identical content as the preceding and subsequent fields Nos. 3 and 5, the mode detector 141 determines that the field is in the still picture mode. The interpolation control signal generator 311 accordingly sets the coefficient k to zero dependent on the mode signal M from the mode detector 141 and the picture movement signal G from the movement detector 142. Accordingly, the same interpolation operation as that of the adjacent field having a close correlation with the present field is carried out.

For example, in order to interpolate the pixel between the pixels bc2 and bc4 in the field No. 4, the interpolation signal is generated from the value of the pixel bc3 located at the same vertical position in the preceding field No. 3 (BC1) or the pixel bc3 at the same vertical position in the subsequent field No. 5 (Bc1).

The field No. 5 (Bc1) is determined as being in the previously inclined film moving picture mode by the mode detector 141. The interpolation control signal generator 311 accordingly sets the coefficient k to zero dependent on the mode signal M from the mode detector 141 and the picture movement signal G from the movement detector 142. Namely, in order to determined the interpolation pixel between the pixels bc1 and bc3 in the field No. 5 (Bc1), the pixel bc2 which exists at the same vertical space in the preceding field No. 4 is selected and the value thereof is set as that of the interpolation pixel.

In the system of the present invention, the correlation between the present field and the preceding field, and the correlation between the present field and the subsequent field are detected. The correlation values are compared with each other and when the difference there-between is large, the telecine-converted signal is detected. Since the operation is executed every field, the telecine-converted signal can be quickly discriminated from the ordinary television signal.

Moreover, the manner of interpolation is determined in accordance with the correlation between the fields so that an appropriate interpolation is readily carried out.

Figure 6:
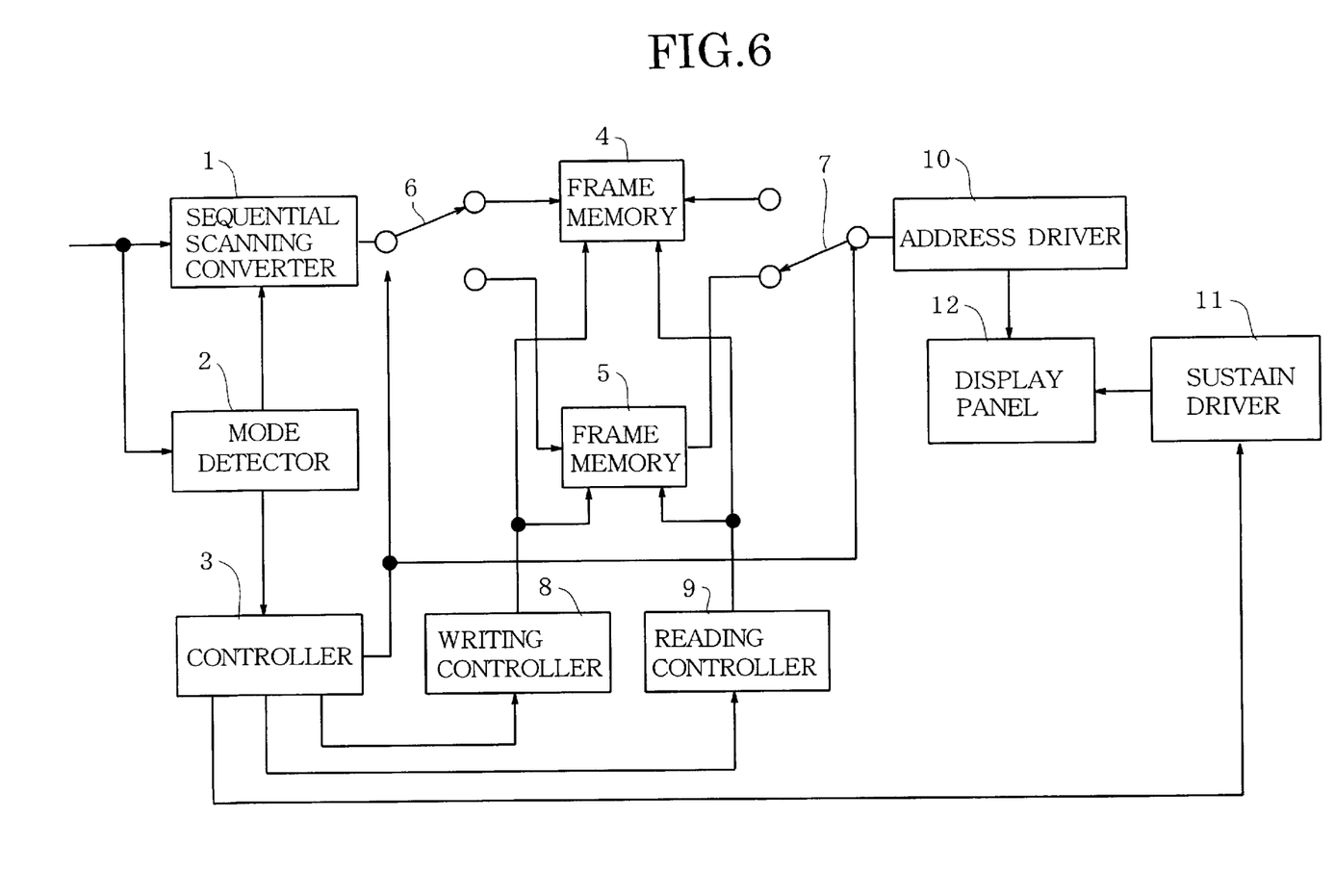
FIG. 6 is a display system according to a second embodiment of the present invention.

FIG. 6 shows a display system wherein the method of displaying the image can be changed depending on whether the input video signal is the ordinary television video signal or the telecine-converted video signal.

Referring to FIG. 6, the display system comprises a sequential scanning converter 1 and a mode detector 2 to both of which is fed a video signal formed by interlaced scanning for the NTSC system at a frame frequency of 30 Hz. The mode detector 2 adds absolute values of differences between the frames for the period of one field and compares the added values with a predetermined threshold. When the added value is larger than the threshold, a moving field is detected. Otherwise, a still field is detected. When the input video signal is a telecine-converted film signal generated in accordance with the 2-3 pull-down method, the still field is detected every five fields. When such a periodic pattern is formed, the mode detector 2 determines that the input signal is a telecine-converted video signal and applies the detected information to the sequential scanning converter 1 and a controller 3.

Depending on the information from the mode detector 2, the sequential scanning converter 1 produces an interpolation scanning signal generated in accordance with the intra-field interpolation and/or the inter-field interpolation described in conjuncture with the first embodiment. Hence, the input interlaced scanning signal is converted to an interpolated sequential scanning signal.

For example, when the input signal is the telecine-converted video signal generated by the 2-3 pull-down method, the sequential scanning converter 1 produces the interpolation signal based on the inter-field interpolation using the adjacent field within the same frame. On the other hand, when the ordinary television signal is applied, the movement adapted interpolation described above is carried out to produce the interpolated sequential scanning video signal.

The controller 3 controls the operation of a changeover switches 6 and 7, writing controller 8, and a reading controller 9 in accordance with the information from the mode detector 2. Each of the controllers 8 and 9 applies a memory control signal to frame memories 4 and 5. The changeover switch 6 is operated in accordance with a changeover signal from the controller 3 so that the interpolated sequential scanning signal are selectively written in the frame memories 4 and 5 alternately. The video signals in the frame memories 4 and 5 are alternately read out in synchronism with the writing operation in accordance with the memory control signal from the reading controller 9.

The video signals read out from the frame memories 4 and 5 are applied to a display panel 12 such as the plasma display panel, through the changeover switch 7 and an address driver 10. A sustain driver 11 is fed with a driving signal from the controller 3 to operate the display panel 12. Thus a picture based on the interpolated sequential scanning signal is shown on the display panel 12.

For example, when the input signal is the telecine-converted video signal, the input video signal is written in the frame memories 4 and 5 in accordance with the memory control signal from the writing controller 8, leaving out a field having the identical picture as the previous field. The memory control signal from the reading controller 9 operates to alternately read the signal from the frame memories 4 and 5 at 24 Hz. The telecine-converted video signal is fed to the display panel 12, thereby driving the panel at the frequency of 24 Hz. On the other hand, if the input signal is the ordinary television video signal produced by scanning with the television camera, the video signal is written in the frame memories 4 and 5 and read out at 60 Hz. Accordingly, the display panel 12 is driven at a frequency of 60 Hz. The operation of the system of FIG. 6 is described more in detail with reference to FIGS. 7 and 8.

Figure 7:
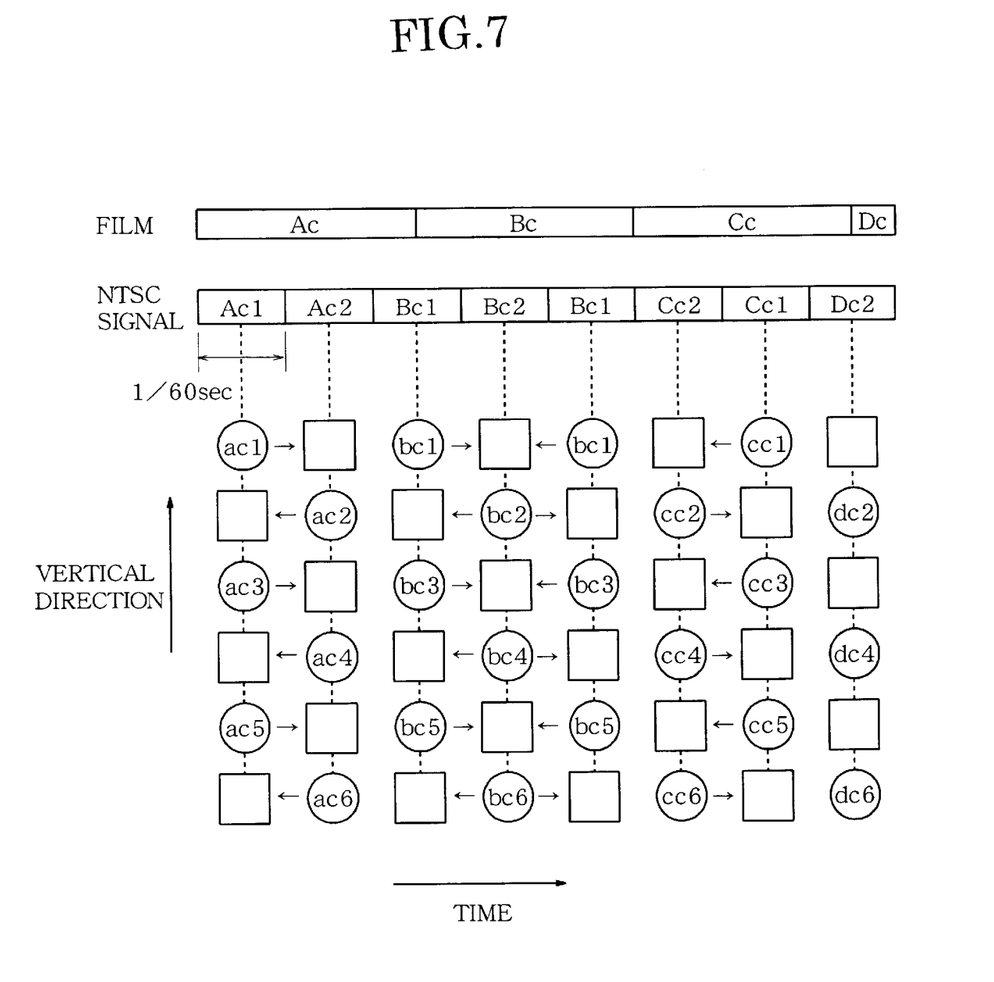
FIG. 7 is a diagram explaining positions of actual scanning signals and interpolated scanning signals of a telecine-converted video signal in the second embodiment.

Referring to FIG. 7, a video signal produced from a film is a non-interlaced scanning video signal of 24 Hz. Such a video signal is converted to an interlaced scanning video signal of 30 Hz for the NTSC system by the 2-3 pull-down method. Namely, a film frame Ac corresponds to fields Ac1 and Ac2, and a film frame Bc corresponds to fields Bc1, Bc2 and Bc1. The circle indicates a pixel of the actual scanning line and the square, the pixel of the interpolated scanning line.

When the mode detector 2 determines that the input signal is the telecine-converted video signal, the sequential scanning converter 1 generates an interpolated sequential scanning video signal by the inter-field interpolation. For example, each pixel of the interpolation scanning line in the field Ac2 is set to a value of a pixel of the same vertical position in the preceding adjacent field Ac1, and each pixel of the interpolation scanning line in the field Bc1 is set to a value of a pixel of the same vertical position in the subsequent adjacent field Bc2. The pixel in the field Bc2 is interpolated by the pixel in either of the preceding and subsequent fields Bc1.

Figure 8:
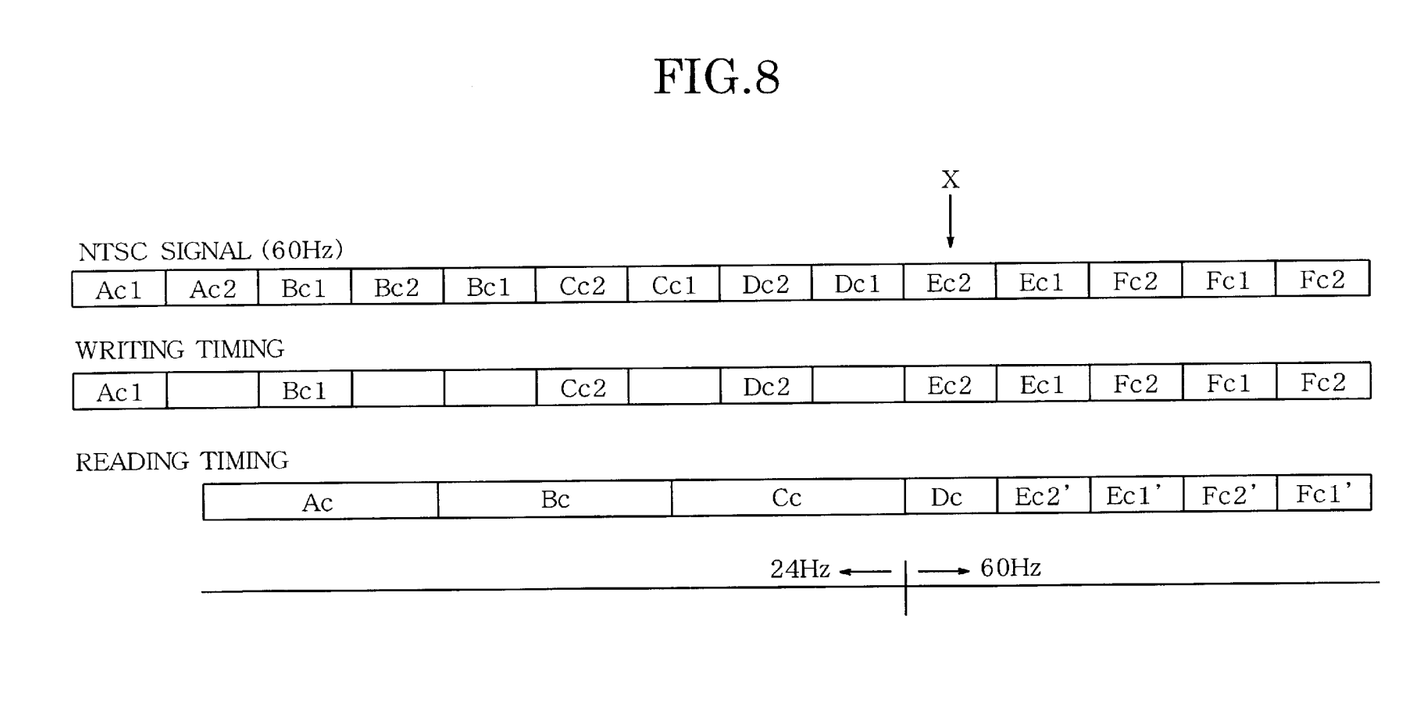
FIG. 8 is a diagram explaining timings for writing a video signal in a frame memory and reading the signal therefrom.

FIG. 8 explains timings for writing and reading out the interpolated sequential scanning signal. As shown in FIG. 8, the telecine-converted signal, which is adapted for the NTSC system of 60 Hz, comprises fields Ac1, Ac2, Bc1, Bc2, Bc1, Cc2, and so on to Fc2. The telecine-converted signal is edited so that there is a discontinuity at a position marked X in the drawing. Namely, another field Dc2 which existed between the fields Dc1 and Ec2 is missing, thereby disturbing the periodic pattern.

The field Ac1 is written in the frame memory 4 (FIG. 6) through the changeover switch 6 at the writing timing in FIG. 8. The field Ac2 which is identical with the field Ac1 is not written. Next, the field Bc1 is written in the frame memory 5 through the changeover switch 6. The subsequent fields Bc2 and Bc1 which are identical with the field Bc1 are not written. The field Cc2 is then written in the frame memory 4 through the changeover switch 6. The subsequent field Cc1 which is identical with the field Cc2 is not written, and the field Dc2 is written. Thus fields are intermittently written in the frame memories 4 and 5.

The video signals written in the frame memories 4 and 5 are alternately read out at 24 Hz. Namely, the field Ac1 is read out at 24 Hz from the frame memory 4, and thereafter, the field Bc1 is read out at 24 Hz from the frame memory 5. Then the field Cc1 is read out from the frame memory 4 at 24 Hz.

Thus, the video signal is read out from the frame memories 4, 5 in synchronism with the intermittent writing operation. Hence, a signal similar to the sequential scanning signal having a frame frequency of 24 Hz is obtained.

However, when there is the point X where the periodic pattern of two fields and three fields is broken, the mode detector 2 detects a field where the signal is changed from the telecine-converted signal to another signal. When such a discontinuity occurs, the video signal is continuously written in and read from the frame memories 4 and 5 at 60 Hz. Hence the video signal becomes a signal of 60 Hz. The address driver 10, in cooperation with the sustain driver 11, drives the display panel 12 at 60 Hz.

Thus in accordance with the present embodiment, the the video signal produced from a film can be converted into a signal similar to a sequential scanning signal of 24 HZ and shown on the display panel. Hence the picture on the display panel has the same number of frames as the projected film so that the quality of the picture is improved to almost equal to that of the film.

The mode detector 2 may be modified to determine whether the mode of the field is the previously inclined film moving picture mode, subsequently inclined film moving picture mode, television moving picture mode, or the still picture mode as in the first embodiment.

Figure 9:
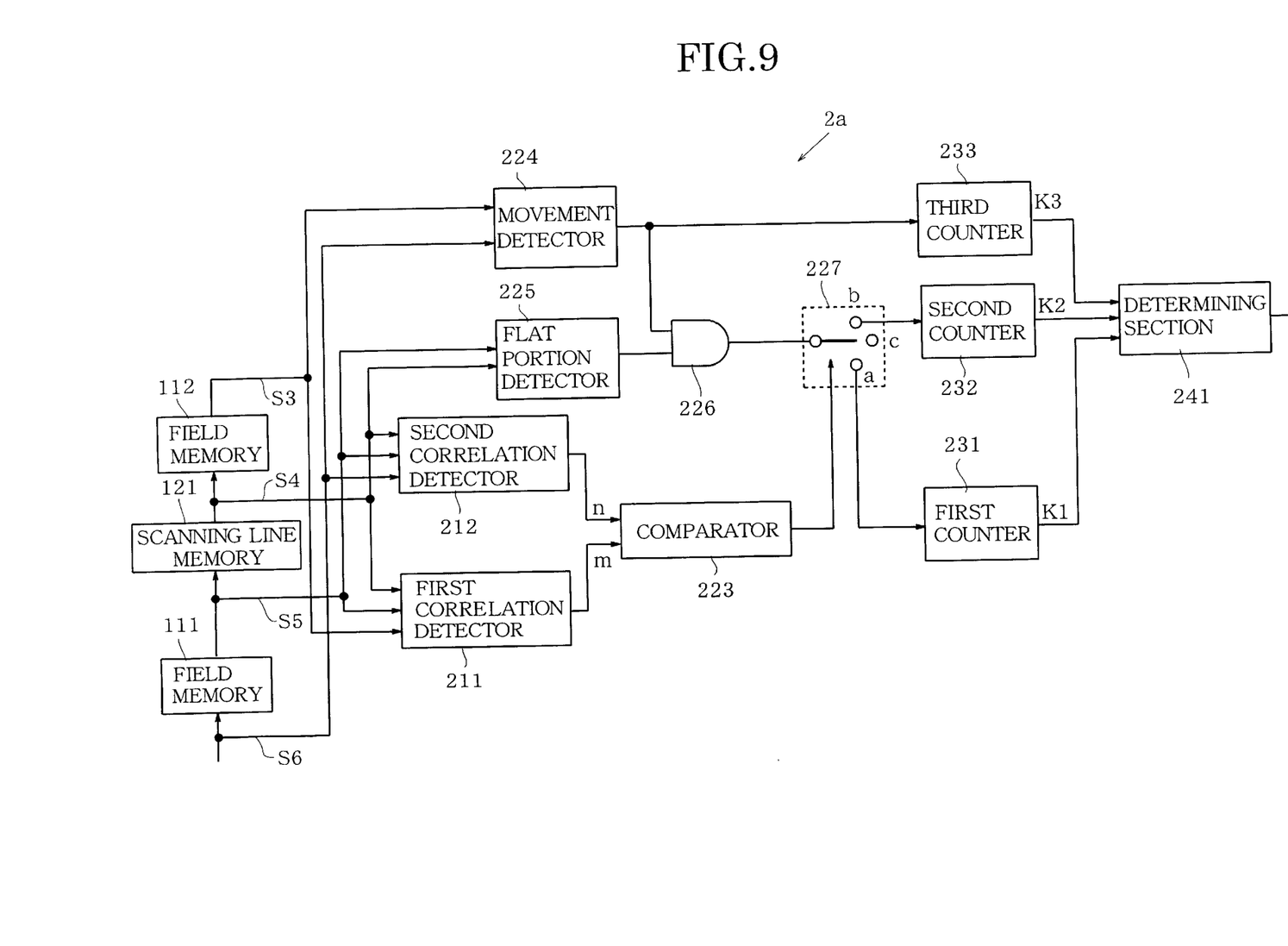
FIG. 9 is a block diagram of a mode detector provided in a modification of the display system of the second embodiment.

More particularly, referring to FIG. 9, a mode detector 2a has a construction similar to the mode detector 141 shown in FIG. 2, and is fed with the video signals S3 from the field memory 112, video signal S4 from one scanning line memory 121, video signal S5 from the field memory 111 and the input video signal S6. The same reference numbers as those in FIG. 2 designate the same parts in FIG. 9 and therefore the detailed description thereof are omitted.

Hence, in the present modification, a field where the telecine-converted video signal is changed to the ordinary television signal can be quickly detected.

While the invention has been described in conjunction with preferred specific embodiment thereof, it will be understood that this description is intended to illustrate and not limit the scope of the invention, which is defined by the following claims.

What is claimed is:

1. A method for identifying an input video signal, the steps comprising:

detecting a first correlation between a present field of the input video signal and a one-field preceding field, and a second correlation between the present field and a one-field succeeding field, the first correlation being provided by adding together points which are flat in a vertical direction and moving in a horizontal direction in a range where the correlation between the present field and the one-field preceding field is larder than a correlation between the present field and the one-field succeeding field, the second correlation being provided by adding together points which are flat in the vertical direction and moving in the horizontal direction in a range where the correlation between the present field and the one-field succeeding field is larger than a correlation between the present field and the one-field preceding field;

comparing the first correlation and the second correlation with each other; and determining the input video signal as a telecine-converted video signal when either of the first correlation or the second correlation is larger than the other correlation.

2. The method according to claim 1 further comprising, determining the input video signal as a video signal of a standard television when the first correlation and the second correlation are equal to each other and the input video signal is a moving picture.

3. A method for processing a video signal wherein an interpolation scanning signal is produced from an interlaced actual scanning input video signal, the actual scanning input video signal and interpolation scanning signal are mutually inserted, the steps comprising:

detecting a first correlation between a present field of the input video signal and a one-field preceding field, and a second correlation between the present field and a one-field-succeeding-field;

comparing the first correlation and the second correlation with each other;

producing the interpolation scanning signal by using the actual scanning video signal in the one-field preceding field when the first correlation is larger than the second correlation, and producing the interpolation scanning signal by using the actual scanning video signal in the one-field succeeding field when the second correlation is larger than the first correlation; and obtaining a first interpolation scanning signal by an intra-field interpolation process, and a second interpolation scanning signal by an inter-field interpolation process when the first correlation and the second correlation are equal to each other and the input video signal is a moving picture, whereby the interpolation scanning signal is acquired by weighting and adding together the first and second interpolation scanning signals by using movement information of the video signal.

4. The method according to claim 3 wherein the first correlation is provided by adding together points which are flat in a vertical direction and moving in a horizontal direction in a range where the correlation between the present field and the one-field preceding field is larger than a correlation between the present field and the one-field succeeding field, and the second correlation being provided by adding together points which are flat in vertical direction and moving in the horizontal direction in a range where the correlation between the present field and the one-field succeeding field is larger than a correlation between the present field and the one-field preceding field.

5. A display device comprising:

a display panel;

converting means for converting an interlaced input video signal into sequential scanning video signal;

detector means for detecting whether therefor-the input video signal is a telecine-converted video signal of a unit of 60 Hz field which is obtained by converting a film source of 24 Hz or not;

a frame memory;

frame memory control means for controlling writing and reading of the converted sequential scanning video signal in and from the frame memory;

display panel driving means for driving the display panel by the sequential scanning video signal read out from the frame memory;

the converting means being provided for producing the sequential scanning video signal by an inter-field interpolation process by using fields in a same frame, and the frame memory control means being provided for removing an overlapping field and for writing a field remained at the removing in the frame memory and reading out the stored field at 24 Hz when the input video signal is determined as the telecine-converted video signal by the detector means.

6. The display device according to claim 5 wherein the frame memory control means is provided for writing and reading out the input video signal in and from the frame memory at 60 Hz when the input video signal is detected as a signal different from the telecine-converted video signal.

7. The display device according to claim 6 wherein the detector means is provided for detecting the telecine-converted video signal in accordance with the correlation between a preceding field and a succeeding field at every field.

* * * * *